United States Patent
Torigoe et al.

(10) Patent No.: US 7,359,896 B2
(45) Date of Patent: Apr. 15, 2008

(54) INFORMATION RETRIEVING SYSTEM, INFORMATION RETRIEVING METHOD, AND INFORMATION RETRIEVING PROGRAM

(75) Inventors: Shin Torigoe, Tokyo (JP); Atsushi Ikeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 467 days.

(21) Appl. No.: 10/882,263

(22) Filed: Jul. 2, 2004

(65) Prior Publication Data

US 2005/0004902 A1 Jan. 6, 2005

(30) Foreign Application Priority Data

Jul. 2, 2003 (JP) .............................. 2003-190556

(51) Int. Cl.
*G06F 17/30* (2006.01)
(52) U.S. Cl. ........................................................... 707/4
(58) Field of Classification Search ............. 707/1–10, 707/100–104.1, 200–205
See application file for complete search history.

(56) References Cited

U.S. PATENT DOCUMENTS

| | | | | |
|---|---|---|---|---|
| 5,469,354 A | * | 11/1995 | Hatakeyama et al. | 707/3 |
| 5,787,414 A | * | 7/1998 | Miike et al. | 707/2 |
| 6,094,649 A | * | 7/2000 | Bowen et al. | 707/3 |
| 7,143,091 B2 | * | 11/2006 | Charnock et al. | 707/5 |
| 2003/0046311 A1 | * | 3/2003 | Baidya et al. | 707/200 |
| 2003/0182310 A1 | * | 9/2003 | Charnock et al. | 707/104.1 |

FOREIGN PATENT DOCUMENTS

JP 2002-132811 5/2002

* cited by examiner

*Primary Examiner*—Hosain Alam
*Assistant Examiner*—Navneet K Ahluwalia
(74) *Attorney, Agent, or Firm*—Venable LLP; Michael A. Sartori; Catherine M. Voorhees

(57) ABSTRACT

In this invention, a database in which a keyword and an attribute of the keyword are stored together with a document ID for discriminating a source document is arranged, at least one keyword and/or retrieval key constituted by attribute information which is not specified as a keyword is input, and the database is retrieved on the basis of the keyword and/or the attribute of the attribute information. As a result, the source document can be specified by the keyword input as the retrieval key, and retrieval intention is reflected by the attribute information input as the retrieval key.

15 Claims, 6 Drawing Sheets

FIG.3

| DOCUMENT ID | DOCUMENT |
|---|---|
| 1 | WITH PRESIDENT OF ELECTRIC COMPANY A ⋯ |
| 2 | ELECTRIC COMPANY A (PRESIDENT BB) IS ⋯ |
| 3 | OF JAPANESE COMPANY ⋯ |
| 4 | ELECTRIC COMPANY ○○ (PRESIDENT ××) IS △△△△△△ OF ELECTRIC COMPANY A ⋯ |

FIG.4

| | MORPHOLOGICAL ANALYSIS RESULT | ATTRIBUTE ANALYSIS RESULT |
|---|---|---|
| ELECTRIC COMPANY A | PROPER NOUN | ORGANIZATION |
| PRESIDENT | GENERAL NOUN | SLOT |
| BB | UNKNOWN WORD | FULL NAME, ORGANIZATION |

FIG.5

| DOCUMENT ID | KEYWORD | ATTRIBUTE | ATTRIBUTE VALUE |
|---|---|---|---|
| 1 | PRESIDENT | SLOT | 5 |
| 1 | ELECTRIC COMPANY A | ORGANIZATION | 16 |
| 2 | ELECTRIC COMPANY A | ORGANIZATION | 1 |
| 2 | PRESIDENT | SLOT | 18 |
| 2 | BB | FULL NAME | 27 |
| 3 | JAPAN | NATION NAME | 3 |
| 3 | COMPANY | null | 11 |
| 4 | ELECTRIC COMPANY ○○ | ORGANIZATION | 1 |
| 4 | PRESIDENT | SLOT | 19 |
| 4 | ×× | FULL NAME | 28 |
| 4 | ELECTRIC COMPANY A | ORGANIZATION | 41 |

FIG.7

| WHO | PRESIDENT | ELECTRIC COMPANY A |

FIG.8

| KEYWORD | ATTRIBUTE |
|---------|-----------|
| WHO | FULL NAME |
| WHEN | DATE AND TIME, SEASON |
| WHERE | ADDRESS, ORGANIZATION, PLACE NAME, NATION NAME |
| ⋮ | ⋮ |

FIG.9

| WORD | WHO | PRESIDENT | ELECTRIC COMPANY A |
|------|-----|-----------|---------------------|
| ATTRIBUTE | FULL NAME | SLOT | ORGANIZATION |

INFORMATION RETRIEVING SYSTEM, INFORMATION RETRIEVING METHOD, AND INFORMATION RETRIEVING PROGRAM

CROSS REFERENCE TO RELATED APPLICATIONS

The disclosure of Japanese Patent Application No.JP2003-190556, filed Jul. 2, 2003, entitled "Information Retrieving System, Information Retrieving Method, and Information Retrieving Program." The contents of that application are incorporated herein by reference in their entirety.

BACKGROUND OF THE INVENTION

1. Field of the Invention

The present invention relates an information retrieving system, an information retrieving method, and an information retrieving program which can be applied to, for example, retrieval of an electronic document or a word in an electronic document with an arbitrary keyword.

2. Description of the Related Art

A retrieval engine disclosed in the Internet is established as a tool that lists addresses (URLs) of Web pages related to input keywords on the basis of a predetermined order of priority to make it possible to checks any and all things from business articles to objects for pleasure.

However, when a matter (for example, a place or the like) related to a retrieval keyword is desired to be known, a large number of documents in which the matter is not described are listed in a retrieval result in retrieval using only a keyword. Even though the documents include the matter, the documents must be read, and it is difficult to efficiently know the matter.

As a method of solve this problem, a method disclosed in Japanese Patent Laid-open Publication No. 2002-132811 is known. In this method, a question sentence (for example, "What is the capital of Japan?") is input, after the question sentence is analyzed, a related document is retrieved according to the analysis result. In addition, an answer to the question sentence (for example, "Tokyo") is obtained and output.

However, in a method described in Japanese Patent Laid-open Publication No. 2002-132811, since an answer is formed on the basis of a document serving as a retrieval result of a keyword to a document database, the retrieval result frequently includes a sentence in which a word serving as an answer is not described, and retrieval efficiency is deteriorated. Furthermore, since the answer is formed by searching the document, long processing time and high processing cost are required when the answer is formed.

SUMMARY OF THE INVENTION

The present invention provides an information retrieving apparatus, an information retrieving method, and an information retrieving program which can rapidly and efficiently obtain an appropriate retrieval result when a retrieval intention is a matter related to a keyword.

In order to solve the above problem, an information retrieving system according to the first aspect of the present invention includes: (1) a database in which a keyword and an attribute of the keyword are stored together with a document ID for discriminating a source document of the keyword; (2) a retrieval key input section which captures at least one keyword and/or retrieval key constituted by attribute information which is not specified as a keyword; (3) a retrieval section which retrieves information from the database on the basis of the keyword and/or the attribute of the attribute information captured by the retrieval key input section; and (4) an output section which outputs an obtained retrieval result.

An information retrieving method according to the second aspect of the present invention includes: (0) a step of using a database in which a keyword and an attribute of the keyword are stored together with a document ID for discriminating a source document of the keyword; (1) a retrieval key input step of capturing at least one keyword and/or retrieval key constituted by attribute information which is not specified as a keyword; (2) a retrieval step of retrieving information from the database on the basis of the keyword and/or the attribute of the attribute information captured in the retrieval key input step; and (3) an output step of outputting an obtained retrieval result.

An information retrieving program according to the third aspect of the present invention is obtained by causing a computer to execute the information retrieving method according to the second aspect of the present invention. The steps of the information retrieving method according to the second aspect of the present invention are described by codes which can be executed by the computer. The data of the database used in the information retrieving method according to the second aspect of the present invention is also described by codes which can be accessed by the computer.

As described above, according to the present invention, an information retrieving system, an information retrieving method, and an information retrieving program that can rapidly and efficiently obtain an appropriate retrieval result when a thing which is desired to be retrieved is related to a keyword can be realized.

BRIEF DESCRIPTION OF THE DRAWINGS

FIG. 3 is a diagram for explaining an example of an input document according to the embodiment;

FIG. 4 is a diagram for explaining a morphological analysis result and an attribute analysis result according to the embodiment;

FIG. 5 is a diagram for explaining registration of a keyword or the like in a database according to the embodiment;

FIG. 7 is a diagram for explaining an example of a retrieval key according to the embodiment;

FIG. 8 is a diagram for explaining a data configuration of a retrieval rule recording unit according to the embodiment; and FIG. 9 is a diagram for explaining an attribute conversion result of an attribute keyword according to the embodiment.

DETAILED DESCRIPTION OF THE PREFERRED EMBODIMENTS

(A) Embodiment

An embodiment of an information retrieving system, an information retrieving method, and an information retrieving program according to the present invention will be described below with reference to the accompanying drawings.

(A-1) Configuration of Embodiment

Figure 1:
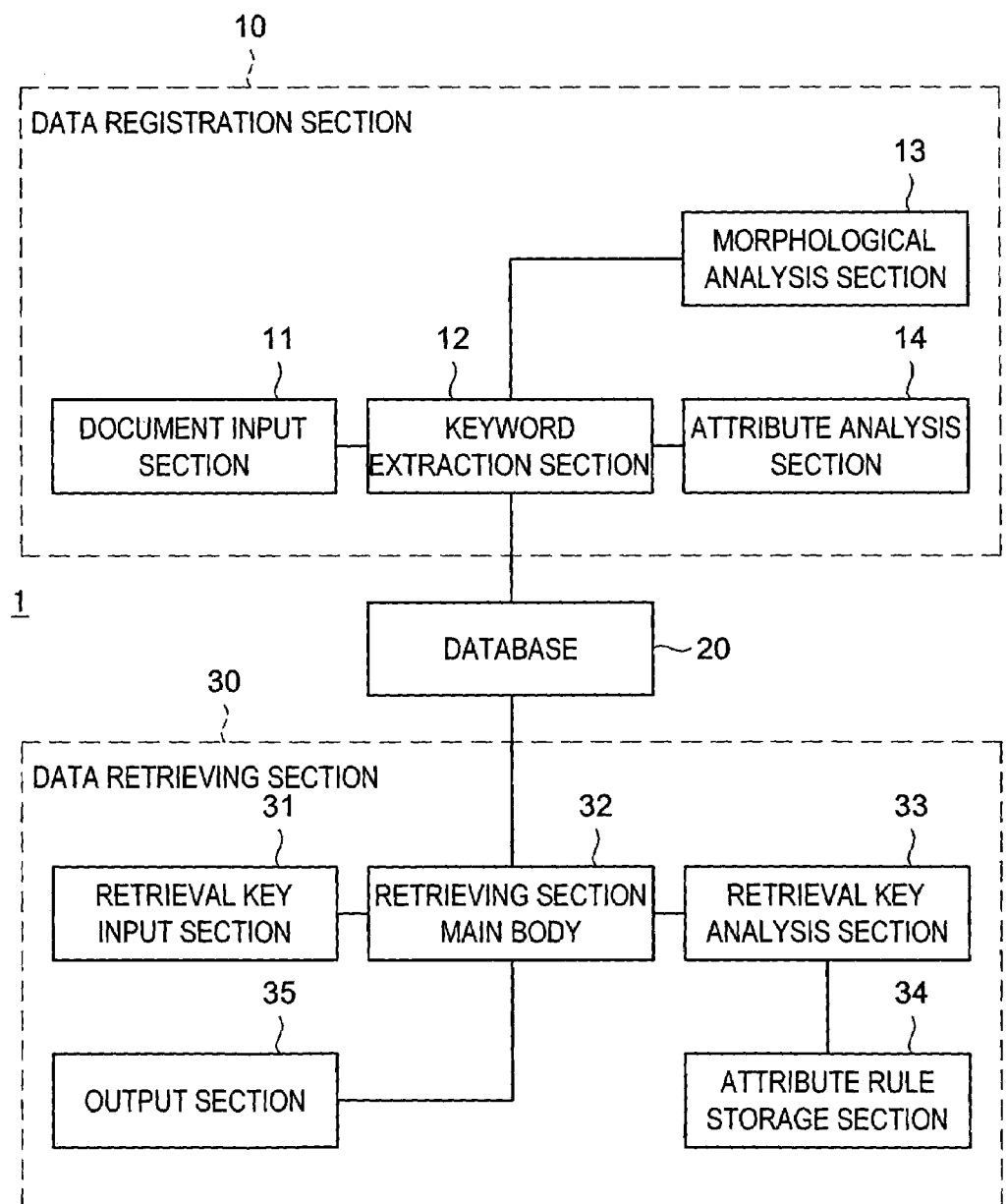
FIG. 1 is a block diagram showing a functional configuration of an information retrieving system according to the embodiment.

FIG. 1 is a block diagram showing a functional configuration of an information retrieving system according to the embodiment. The information retrieving system according to the embodiment is constructed by installing an information retrieving program (including fixed data) in one information processing apparatus typified by a personal computer or the like or constructed by distributing processing routines of an information retrieving program to a plurality of information processing apparatuses such as personal computers and servers. However, functionally, the information retrieving system can have a configuration shown in FIG. 1. The embodiment will be described below as a hardware realized by one information processing apparatus.

An information retrieving system 1 according to the embodiment is roughly constituted by a data registration section 10, a database 20, and a data retrieving section 30.

The data registration section 10 stores data or the like of a document which can serve as a retrieval target in the database 20. The data registration section 10 has a document input section 11, a keyword extraction section 12, a morphological analysis section 13, and an attribute analysis section 14.

The document input section 11 is to input a document (for example, an electronic document) registered in the database 20. For example, the document input section 11 corresponds to, in addition to a keyboard, an access device for a recording medium such as a flexible disk or a CD-ROM, a combination of an image scanner and an OCR (Optical Character Reader), an external data receiving configuration, or the like.

The keyword extraction section 12 extracts a keyword or the like from the input document inputted by the document input section 11 by using the morphological analysis section 13 and the attribute analysis section 14. For example, the keyword extraction section 12 corresponds to a CPU and a program (including fixed data) section executed by the CPU.

The morphological analysis section 13 divides the input document into morphemes and gives word-class information to the morphemes.

For example, the morphological analysis section 13 corresponds to a CPU or a program (including fixed data) section executed by the CPU.

The morphological analysis section 13 is used by the keyword extraction section 12 in keyword extraction. The morphological analysis section 13 may have not only a morphological analysis function but also a parsing function.

The attribute analysis section 14 analyses an attribute to a morphological analysis result obtained by the morphological analysis section 13. For example, the attribute analysis section 14 corresponds to a CPU and a program (including fixed data) executed by the CPU.

The attribute analysis section 14 is used by the keyword extraction section 12 in keyword extraction. In this case, the attribute may be information except for a word class. For example, a meaning or the like held by the word (keyword) can be applied.

The database 20 stores document data or the like which can serve as a retrieval target. For example, the database 20 is realized by a large-capacity storage device such as a hard disk device or an optical disk device. In the database 20, at least one combination of data of an electronic document, a keyword and an attributes related to the data, and data constituted by an attribute value is stored.

The data retrieving section 30 retrieves a corresponding electronic document or sentence from the database 20 depending on a user input such as a keyword. The data retrieving section 30 has a retrieval key input section 31, a retrieving section main body 32, a retrieval key analysis section 33, an attribute rule storage section 34, and an output section 35.

The retrieval key input section 31 inputs a retrieval key constituted by at least one keyword. Combination conditions (AND, OR, and the like) between keywords may be able to be input as retrieval information. The retrieval key input section 31, for example, corresponds to a keyboard, a mouse, and the like which are related to a display screen to make it possible to input data. The retrieval key input section 31 also corresponds to an access configuration or the like for a recording medium which can be input as a retrieving file.

The retrieving section main body 32 analyzes a retrieval key and retrieves a corresponding document from the database 20. For example, the retrieving section main body 32 corresponds to a CPU and a program (including fixed data) section executed by the CPU.

The retrieval key analysis section 33 obtains information of an attribute based on an attribute rule stored in the attribute rule storage section 34 with respect to a keyword constituting a retrieval key. For example, the retrieval key analysis section 33 corresponds to a CPU and a program (including fixed data) executed by the CPU. The retrieval key analysis section 33 is executed under the control of the retrieving section main body 32.

The attribute rule storage section 34 stores a corresponding information between a keyword and an attribute. For example, the attribute rule storage section 34 is realized to have a table configuration in a nonvolatile memory such as an EEPROM. The storage contents of the attribute rule storage section 34 correspond to attribute analyzing information stored in the attribute analysis section 14 described above. For example, the same attribute can be obtained for the same term (for example, a morpheme or a keyword).

The output section 35 outputs a retrieval result (for example, a document) for a retrieval key from the database 20. The output section 35 corresponds to not only a display or a printer but also a storage device or a communication section for file information depending on conditions.

(A-2) Operation of Embodiment

An operation of the information retrieving system (information retrieving method) constituted by the above sections will be described below with reference to the drawings.

(A-2-1) Registration Operation for Database

Figure 2:
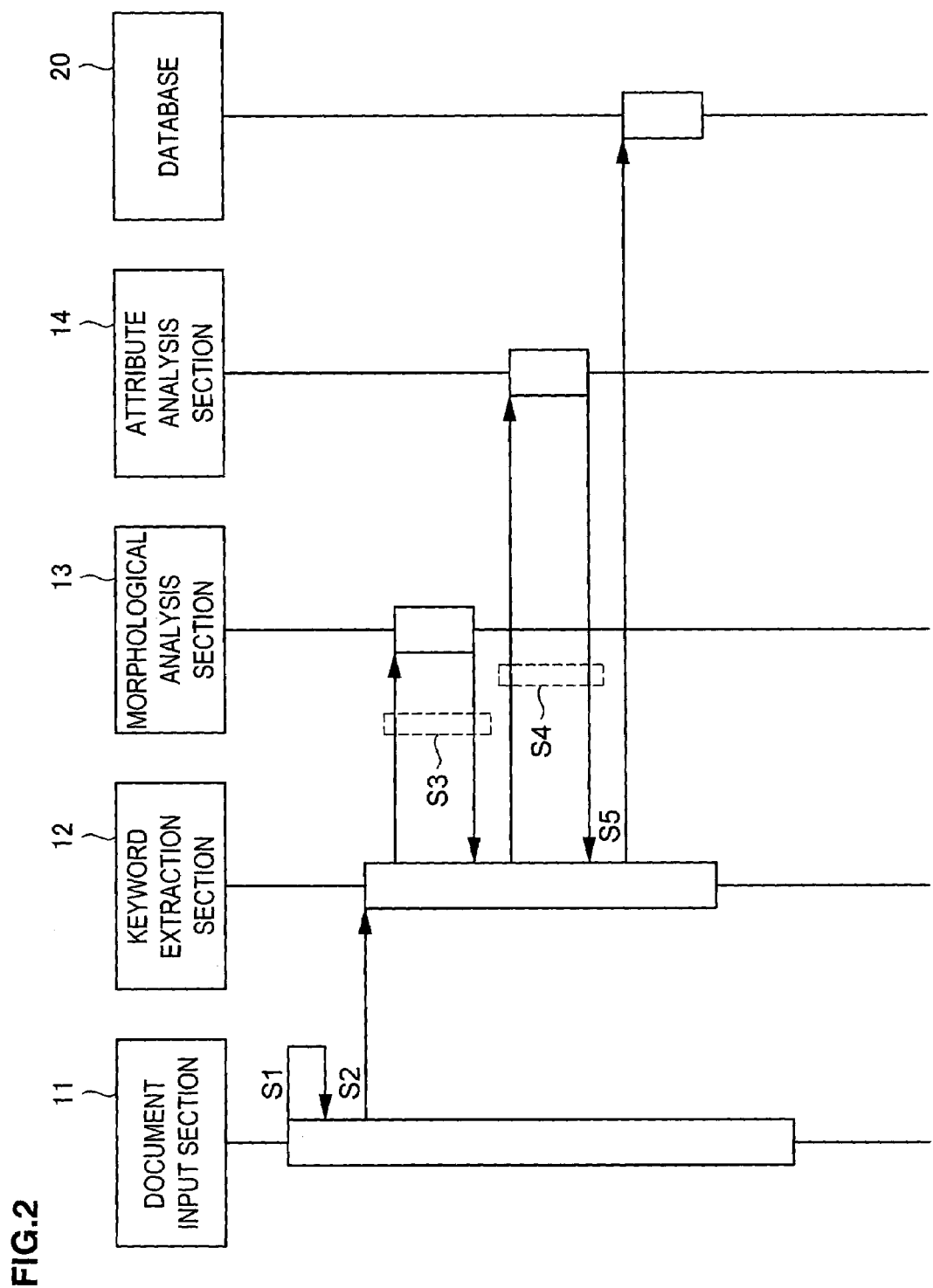
FIG. 2 is a sequence diagram showing a data registration operation according to the embodiment.

An operation of causing the data registration section 10 to register data in the database 20 will be described below with reference to FIG. 2.

The document input section 11 captures an electronic document to be registered in the database 20 (S1). The document, i.e., may be captured by inputting an existing document, or may be loaded from a Web page by automatically circulating on the Internet. In the latter case, an unnecessary tag, an unnecessary image, an unnecessary advertisement, or the like is preferably removed from the document.

FIG. 3 shows captured electronic documents. Document IDs for discriminating the documents from each other are given to the documents, respectively. The document IDs are given by the database 20. When a region for document IDs is secured in design of the database 20 to automatically set the document IDs, the document IDs are added as 1, 2, 3, . . . , or can employ unique values when the documents are registered in the database 20.

The keyword extraction section 12 stores the electronic documents obtained by the document input section 11 in the database 20 and extracts a keyword (S2).

The keyword extraction process includes a process (S3) of separating words (morphemes) constituting a sentence and obtaining word classes of the words by a morphological analysis section 13 and a process (S4) of giving the attributes of the words (attributes except for the word classes of the words) and attribute values by the attribute analysis section 14 to form a keyword. The keyword extraction section 12 registers the formed keyword and the attribute (attribute name and the attribute value) in the database 20 (S5).

The attribute name, for example, can be obtained by referring to a table (e.g., "Japan: nation name", "president: slot", and the like) which causes words to respond to attribute names, or can be obtained from a word dictionary with attributes. In attribute analysis, in addition, a giving rule for an unknown word is applied. In the attribute analysis section 14, an attribute may be given to a plurality of words separated from each other in a morphological analysis result. As an existing morphological analysis section, a morphological analysis section which can analyze an attribute is present. However, such a morphological analysis section 13 is applied, the attribute analysis section 14 can be omitted.

FIG. 4 shows a morphological analysis result and an attribute analysis result according to a document (first sentence) having a document ID of "2" in FIG. 3.

In the example in FIG. 4, attributes "full name" and "organization" are given to an unknown word "BB". This is based on a prepared giving rule that gives attributes "full name" and "organization" to an unknown word immediately following a word "president".

If an input sentence is "president of electronic company A is BB", parsing may be also performed to capture that the unknown word "BB" is a full name. The number of attributes to be given may be 2 or more, and some word may not have an attribute. In addition, an attribute is given to the whole of a word string such as "president of electric company A" to obtain a keyword, or attributes may be separately given to the words "electric company A" and "president" (see FIG. 5) which are obtained by dividing the word string to obtain keywords. For example, attributes are preferably given to the whole of a word string having numerals such as "eighteen years old", "ten billion yen", "one hundred million persons".

A keyword, for example, is limited to a word class such as a noun.

An existing keyword extraction method (forming method) related to a document can be applied except that an attribute is given.

FIG. 5 shows a data configuration of a keyword stored in the database 20 by keyword extraction.

One record is constituted by a document ID of an extraction source of the keyword, the keyword (character string), an attribute (attribute name), and an attribute value. The attribute value mentioned here is, for example, a position where the keyword appears in the sentence (the position of a first character of the keyword in the sentence). When an attribute is set as an item of a keyword record, a narrow-down process using an attribute name in document retrieval can be performed. The attribute and the attribute value are not always necessary, and may be the value "null".

(A-2-2) Retrieving Operation from Database

Figure 6:
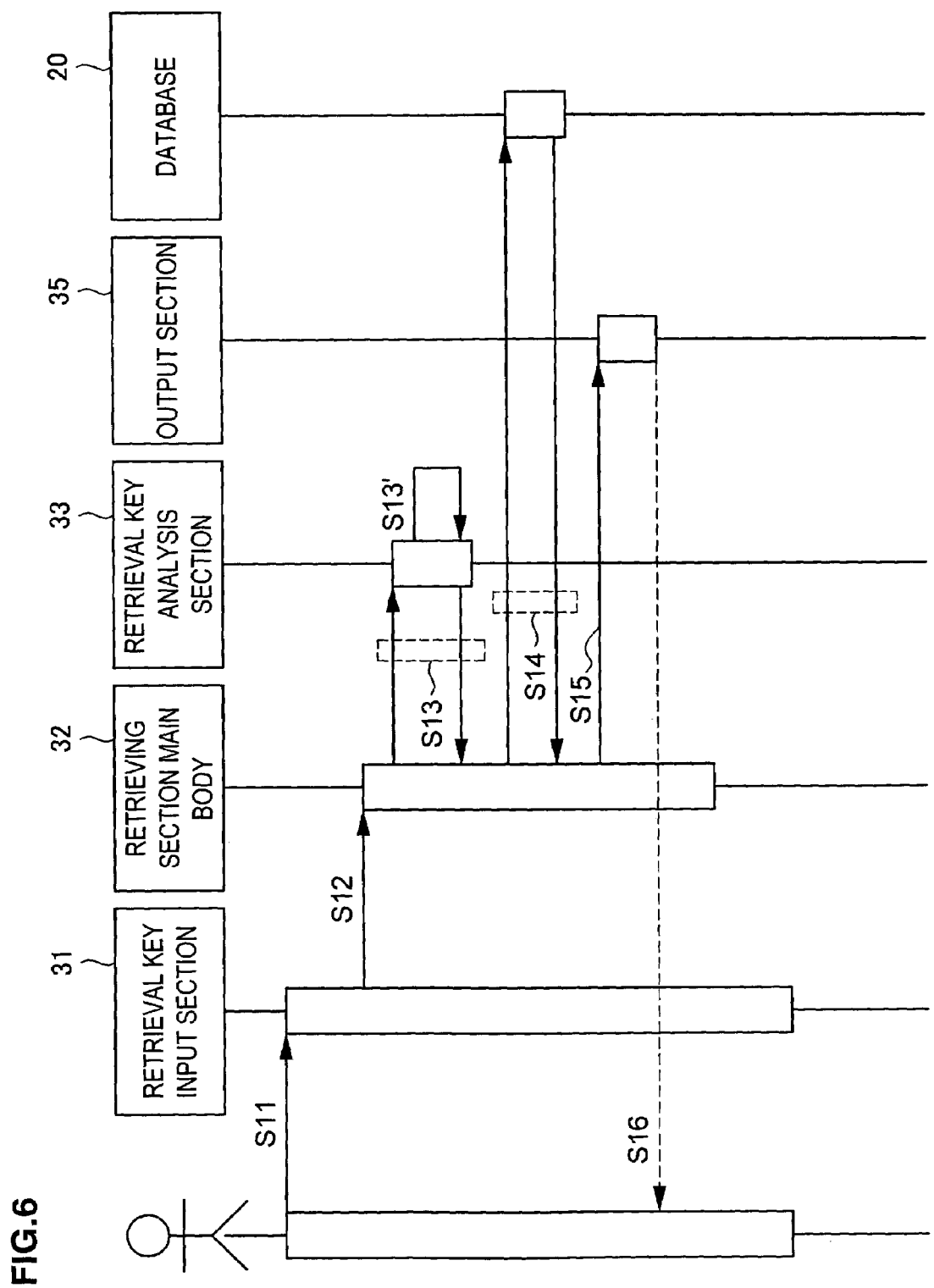
FIG. 6 is a sequence diagram showing a data retrieving operation according to the embodiment.

A document retrieving operation from the database 20 by the data retrieving section 30 will be described below with reference to FIG. 6.

The retrieval key input section 31 captures at least one keyword (S11). The keyword may be captured by inputting a keyword by a user, or may be loaded from another execution module.

FIG. 7 shows retrieval keywords. In FIG. 7, retrieval of an electronic document including three keywords "who", "president", and "electric company A" is required. In this case, a blank between keywords means "AND". Unlike FIG. 7, a format that can clearly indicate "AND" or "OR" may be used. In addition to FIG. 7, the maximum number of documents output by retrieval may be designated.

In FIG. 7, an interrogative word "who" does not mean retrieval of a document including "who" itself. The interrogative word means retrieval of a document including a keyword having the same attribute as the attribute held by "who" (such a keyword is called an attribute keyword in the following description). In other words, "who" does not mean a keyword, and rather defines an attribute. In this embodiment, in addition to "who", various attribute keywords such as "when", "where", "how old", and "how many persons" can be applied. The attribute keyword depends on the storage contents of the attribute rule storage section 34.

FIG. 7 shows a retrieval keyword input when a user tries to know whether "Who is the president of electric company A?" from a retrieval document. Such retrieval is performed when a user wants to know the contents of an entire document such as a news article and to know only a predetermined matter through the retrieval document.

When a user wants to perform retrieval by using a character "who" itself as a keyword, an escape process such as "[who]" is performed (using an escape code [ ]).

The retrieving section main body 32 plays a central role (under the control of the retrieving section main body 32), by using an input keyword, a corresponding document is retrieved from the database 20 (S12). The retrieving section main body 32 may not execute retrieval when all retrieval keywords or retrieval keyword groups are attribute keywords or when the number of keywords except for attribute keywords is a predetermined number or less, and may output that the retrieval keywords and the retrieval keyword groups are attribute keywords or that the number of keywords except for attribute keywords is the predetermined number or less.

The retrieving section main body 32 calls the retrieval key analysis section 33 to cause the retrieval key analysis section 33 to execute analysis of an attribute to the input keyword (S13). At this time, the retrieval key analysis section 33 uses the storage contents of the attribute rule storage section 34 to given an attribute to the keyword (S13').

FIG. 8 shows an example obtained when the attribute rule storage section 34 is constituted by a corresponding table. In FIG. 8, conversion rules such as "who" to "full name", "when" to "date and time, season", "where" to "address, organization, place name, nation name" are held. When not only these interrogative words but also conversion rules for keywords are increased in number, the retrieving section main body 32 can cope with various attributes. For example, numerical attributes such as "how old" and "how many persons" may be thinkable. In addition, an attribute keyword such as "full name" which is not an interrogative word is preferably prepared. In this manner, the attribute keyword name and the attribute name can also be made equal to each other. Attribute analysis of a retrieval key by the retrieval key analysis section 33 is the same analysis as that performed by the attribute analysis section 14. If a keyword except for an attribute keyword is used, the same attribute is given to the same word. An attribute may be given to a normal keyword except for an attribute keyword.

FIG. 9 shows an attribute analysis result obtained after the process performed by the retrieval key analysis section 33 to the input retrieval keyword shown in FIG. 7 is finished. Attributes "full name", "slot", and, "organization" are given to retrieval keywords "who", "president", and, "electric company A" respectively. The attribute rule storage section 34 may be designed to make it possible to give an attribute to only an attribute keyword. The attribute rule storage section 34 may give a flag for discriminating an attribute keyword from another keyword.

For example, when an attribute is also given to a normal keyword, if a document cannot be retrieved by the keyword name, the retrieval can be executed again such that the keyword is replaced with an attribute name.

The retrieving section main body 32 determines a keyword or an attribute used in retrieval on the basis of the attribute analysis result, and the corresponding document is retrieved from the database 20 (S14).

In this case, with respect to the attribute keyword, a document having the attribute is retrieved. With respect to another keyword, retrieval may be performed by only a keyword name or may be performed by a combination of a keyword name and an attribute name.

For example, in the attribute analysis result in FIG. 9, a document having the keywords "president" and "electronic company A" and the attribute "full name" is retrieved from the database 20. In this case, as a concrete retrieving method, the following retrieving method is known. That is, a set of corresponding document IDs is obtained by retrieval performed by only the keywords, and a set of corresponding document IDs is obtained by only an attribute, so that a document common in both the sets of document IDs is obtained. In addition, a retrieving method that checks whether the document includes the keywords and the attribute or not is also known. The later method is preferable because the method has high retrieving efficiency.

When retrieval is performed by keywords "president" and "electric company A" and an attribute "full name", according to the data in FIG. 5, documents having document IDs "2" and "4" are retrieved. Unlike the embodiment, when "who" is not designated, documents having document IDs "1", "2", and "4" are retrieved in retrieval performed by inputting the keywords "president" and "electric company A".

When an attribute keyword is not included as a retrieval key, retrieval using a keyword (normal keyword) is executed as a matter of course.

The retrieving section main body 32 causes the output section 35 to output the obtained retrieval result (S15). As an output of the retrieval result, a document ID or a document itself the keyword and attribute of which are hit may be used. When a document includes an attribute keyword as a retrieval keyword, in place of the document ID and the document itself, or in addition to the document ID and the document itself, a keyword serving as a designated attribute keyword may be used.

As a retrieval result having a plurality of documents, the documents may be output by ordering the documents by using attribute values. For example, when two documents having document IDs "2" and "4" are retrieved as a retrieval result, distances between character strings calculated by attribute values of the keywords "electric company A" and "president" and the attribute "full name" are "10,0" in a document having a document ID of "2" and "11,0" in a document having a document ID of "4", as described by a calculation expression (will be described later). The priorities of the document having a short distance and the document ID of "2" and an answer "BB" having the attribute "full name" in the document can be increased to make an answer.

As a distance between the "electric company A" and the "full name" in the document having the document ID of "2", an attribute value (1) of the "electric company A" having a smaller attribute value (appearing at the former place) is subtracted from an attribute value (27) of the "full name (BB)" having a larger attribute value (appearing at the later place) to calculate a distance between the start characters, and the number of characters (16) of the "electric company A" having a smaller attribute value is subtracted from the distance to calculate a distance (=27−1−16=10) between character positions of the final character of a word appearing at the former place and the first character of a word appearing at the later place in the document. The distance between the "president" and the "full name" in the document having the document ID of "2" is given by 27−18−9=0 according to the same method of thinking as described above.

On the other hand, the distance between the "electric company A" and the "full name" in the document having the document ID of "4" is given by 41−28−2=11, and the distance between the "president" and the "full name" is given by 28−19−9=0.

When a plurality of distances are obtained, for example, ordering is performed on the basis of a sum of the distances or the maximum distance.

Such ordering may be performed to determine an output order. When the maximum value of the number of output documents is regulated by a user, the ordering may be used to extract the number of documents up to up to the maximum number.

The retrieval result may be output on a display screen for, e.g., a user. the retrieval result may be a return value to another called module (S16).

(A-3) Effect of the Embodiment

According to the above embodiment, a keyword responding to a document is stored in a database for storing the document such that attribute is given to the keyword, and an input of an attribute keyword may be permitted as an input of a retrieval keyword. An attribute name of the responding attribute keyword is obtained. The retrieve data is retrieved in the database by using the attribute name. For this reason, as a retrieval result, only a document having an attribute keyword including a matter desired to be known can be obtained. Furthermore, a retrieval result can be rapidly obtained while suppressing the processing cost.

In the conventional method described in Japanese Patent Laid-open Publication No. 2002-132811, an input questioned sentence is analyzed to determine a word for retrieval, and a document including the word for retrieval is captured. Thereafter, the captured document is analyzed to obtain an answer to the questioned sentence. For this reason, a process of obtaining the answer cannot be performed at a high speed. However, in the embodiment, the answer result can be rapidly obtained.

According to the embodiment, when "electric company A president who age" is input as a retrieval keyword, an answer to "who" and an answer to "age" can be obtained by one retrieval command. However, in the conventional method described in Japanese Patent Laid-open Publication No. 2002-132811, different questioned sentences are formed, and question must be performed twice. Therefore, process efficiency is poor.

Furthermore, according to the embodiment, in retrieval, normal keywords and attribute keywords can be listed without being discriminated from each other. For this reason, for a narrow-down operation or a change of questions, a retrieval keyword can be easily re-input after keywords are changed or increased in number.

Still furthermore, according to the embodiment, a preparative process for retrieval in a data retrieving section is a process of replacing an attribute keyword with an attribute, and does not require a process of analyzing a sentence (questioned sentence). For this reason, the data retrieving section employs a simple configuration (in particular, a program configuration).

(B) Another Embodiment

In the description of the above embodiment, all the elements are arranged on the same information processing apparatus. However, the data registration section 10, the database 20, and the data retrieving section 30 may be arranged on different information processing apparatuses, respectively, so that the data retrieving section 30 can access the database 20 through a communication network. In addition, only the retrieval key input section 31 may be arranged on an information processing apparatus for a user (for example, a browser function), so that the other elements are arranged on another information processing apparatus.

In the embodiment, document IDs are designed to be given by the database 20. However, the document IDs may be designed to be given by the document input section 11.

In the embodiment, the attribute rule storage section 34 stores attributes (names) in respond to attribute keywords. In contrast to this, in respond to the attribute (names), the attribute rule storage section 34 may store all the attribute keywords having the attributes. The attribute rule storage section 34 may employ any configuration. For example, in respond on to the attribute "full name", attribute keywords "who, full name, name, stage name, anyone, . . . " may be stored.

In the embodiment, when a word serving as either an attribute keyword or a normal keyword is used as a retrieval keyword, special inputting is performed (using escape code) when a retrieval keyword is input as a normal keyword. However, special inputting may be performed when a retrieval keyword is input as an attribute keyword.

Furthermore, it is marked that the retrieval keyword is an attribute but an attribute keyword, and the attribute name may be directly input as the retrieve key. For example, when "'full name'" is input, the "full name" is recognized as an attribute name, and the system may access the database 20 without accessing the attribute rule storage section 34.

For example, when "electric company A president who age" including at least two attribute keywords are input as retrieval keywords is input, a document which satisfies four keys, i.e., the keywords "electric company A" and "president" and the attributes "full name (attribute of who)" and "age (attribute of age)" may be retrieved. A document which satisfies three keys, i.e., the keywords "electric company A" and "president" and the attribute "full name" and a document which satisfies three keys, i.e., the keywords "electric company A" and "president" and the attribute "age" are retrieved. If a common document is present, the common document is preferentially output. If a common document is not present, switching is performed such that data responding to the respective retrieved documents are output.

In the above embodiment, a morphological analysis section having a word class specifying function is applied, and the word class of a keyword responding to a document is limited. However, the word class of the keyword responding to the document is not limited, a morphological analysis section which simply divides a document into morphemes may be applied. In this manner, the speed of a data registration process can be made high.

Classification of attributes is not limited to the classification performed in the embodiment. For example, in place of the attribute "organization", an attribute "company" may be given to the "electric company A". An attribute "unknown word" is given to an unknown word, an input "unknown" may be permitted as an attribute keyword. In this case, when the classification of attributes is fine, retrieval by retrieval keys including only attribute keywords may be permitted.

When the present invention is applied to a question answering system which makes only an answer to a question and which does not show a document, main information of electronic documents in the database 20 can be prohibited to be stored.

The present invention can be applied to not only a question answering system which expected to obtain a specific answer but also, e.g., an retrieval engine on the Internet.

What is claimed is:

1. An information retrieving system comprising:
a data registration section in which a keyword and an attribute of the keyword are extracted from a source document;
a database where a keyword and an attribute of the keyword are stored together with a document ID for discriminating the source document;
a retrieval key input section which captures at least one keyword;
an attribute rule registration section where a pair of an attribute keyword and the attribute of the attribute keyword is registered, the attribute keyword being defined as a keyword whose attribute is used for retrieval;
a keyword conversion section which converts a keyword captured from said retrieval key input section into an attribute corresponding to the attribute keyword if the keyword is an attribute keyword registered in said attribute rule registration section;
a retrieval section which retrieves information from the database on the basis of captured keywords and attributes converted from keywords by said keyword conversion section;

an output section which outputs a retrieval result obtained by the retrieval section; and a computer for processing information in the above-mentioned sections wherein the data registration section comprises:

a document input section which captures an electronic document serving as a source of data to be registered in the database;

a keyword extraction section which extracts a keyword from the electronic document captured by the document input section;

an attribute giving section which gives an attribute to the keyword extracted by the keyword extraction section; and a registration section which registers a correspondence of the keyword extracted by the keyword extraction section to the attribute given by the attribute giving section in the database together with a document ID unique to the electronic document.

2. The information retrieving system according to claim 1, wherein if the retrieval key input section captures a predetermined mark attached to an attribute keyword, said keyword conversion section does not convert the attribute keyword into its attribute and said retrieval section retrieves information from the database on the basis of the attribute keyword itself and not on the basis of the attribute of the keyword.

3. The information retrieving system according to claim 1, wherein an attribute corresponding to a keyword in the database has, in addition to an attribute name, appearing position information in a source document as an attribute value, and when a plurality of documents are included in the retrieval results, said retrieval section orders the plurality of documents on the basis of keywords captured by said retrieval key input section and attribute values in the database corresponding to the attribute converted from keywords by said keyword conversion section.

4. An information retrieving method comprising:

a step of using a database in which a keyword and an attribute of the keyword are stored together with a document ID in the database for discriminating a source document;

a document input step of capturing an electronic document serving as a source of data to be registered in the database;

a keyword extraction step of extracting a keyword from the electronic document captured in the document input step;

an attribute giving step of giving an attribute to the keyword extracted in the keyword extraction step; and a registration step of registering a correspondence of the keyword extracted in the keyword extraction step to the attribute given in the attribute giving step in the database together with a document ID unique to the electronic document;

a retrieval key input step of capturing at least one keyword;

an attribute rule registration step of registering a pair of an attribute keyword and the attribute of the attribute keyword in an attribute rule registration section, the attribute keyword being defined as a keyword whose attribute is used for retrieval;

a keyword conversion step of converting a keyword captured from said retrieval key input stamp into an attribute corresponding to the keyword if the keyword is an attribute keyword registered in said attribute rule registration section;

a retrieval step of retrieving Information from the database on the basis of captured keywords and attributes converted from keywords by said keyword conversion step;

an output step of outputting a retrieval result obtained in the retrieval step; and a computer processing sped for processing information in the above-mentioned steps.

5. The information retrieving method according to claim 4, wherein if a predetermined mark attached to an attribute keyword is captured in said retrieval key input step, the attribute keyword is not converted into its attribute and information is retrieved from the database on the basis of the attribute keyword itself and not on the basis of the attribute of the attribute keyword.

6. The information retrieving method according to claim 4, wherein an attribute corresponding to a keyword in the database has, in addition to an attribute name, appearing position information in a source document as an attribute value, and when a plurality of documents are retrieved in said retrieval step, the plurality of documents are ordered on the basis of keywords captured by said retrieval key input step and attribute values in the database corresponding to the attribute converted from keywords by said keyword conversion step.

7. The information retrieving system according to claim 1, wherein said retrieval key input section captures at least one attribute which is not a keyword and said retrieval section retrieves information in the database by using the attribute.

8. The information retrieving system according to claim 1, wherein said retrieval key input section captures at least one pair of a keyword and the attribute of the keyword and said retrieval section retrieves information in the database by using the pair of a keyword and the attribute of the keyword.

9. The information retrieving method according to claim 4, wherein at least one attribute which is not a keyword is captured in said retrieval key input step and information in the database is retrieved in said retrieval step by using the attribute.

10. The information retrieving method according to claim 4, wherein at least one pair of a keyword and the attribute of the keyword is captured in said retrieval key input step and information in the database is retrieved in said retrieval step by using the pair of a keyword and the attribute of the keyword.

11. An information retrieving system comprising:

a data registration section in which a keyword and an attribute of the keyword are extracted from a source document;

a database where a keyword and an attribute of the keyword are stored together with a document ID for discriminating the source document;

a retrieval key input section which captures at least one attribute which is not a keyword;

a retrieval section which retrieves information from the database on the basis of the captured attribute;

an output section which outputs a retrieval result obtained by said retrieval section; and a computer for processing information in the above-mentioned sections wherein the data registration section comprises:

a document input section which captures an electronic document serving as a source of data to be registered in the database;

a keyword extraction section which extracts a keyword from the electronic document captured by the document input section;

an attribute giving section which gives an attribute to the keyword extracted by the keyword extraction section; and a registration section which registers a correspondence of the keyword extracted by the keyword extraction section to the attribute given by the attribute giving section in the database together with a document ID unique to the electronic document.

12. The information retrieving system according to claim 11, wherein said retrieval key input section captures at least one pair of a keyword and the attribute of the keyword and said retrieval section retrieves information in the database by using the pair of a keyword and the attribute of the keyword.

13. The information retrieving system according to claim 12, wherein an attribute corresponding to a keyword in the database has, in addition to an attribute name, appearing position appearing position information in a source document as an attribute value, and when a plurality of documents are included in the retrieval results, said retrieval section orders the plurality of documents on the basis of attribute value in the database corresponding to the pair of a keyword and the attribute of the keyword captured by said retrieval key input section.

14. The information retrieving system according to claim 11, wherein an attribute corresponding to a keyword in the database has, in addition to an attribute name, appearing position appearing position information in a source document as an attribute value, and when a plurality of documents are included in the retrieval results, said retrieval section orders the plurality of documents on the basis of attribute value in the database corresponding to the pair of a keyword and the attribute of the keyword captured by said retrieval key input section.

15. An information retrieving method comprising:

a step of using a database in which a keyword and an attribute of the keyword are stored together with a document ID in the database for discriminating a source document;

a document input step of capturing an electronic document serving as a source of data to be registered in the database;

a keyword extraction steP of extracting a keyword from the electronic document captured in the document input step;

an attribute giving step of giving an attribute to the keyword extracted in the keyword extraction step; and a registration step of registering a correspondence of the keyword extracted in the keyword extraction step to the attribute given in the attribute giving step in the database together with a document ID unique to the electronic document;

a retrieval key input step of capturing at least one attribute which is not a keyword;

a retrieval step of retrieving information from the database on the basis of captured attributes;

an output step of outputting a retrieval result obtained by said retrieval section; and a computer processing step for processing information in the above-mentioned steps.

* * * * *